US008763972B2

(12) United States Patent
Türschel et al.

(10) Patent No.: US 8,763,972 B2
(45) Date of Patent: Jul. 1, 2014

(54) MODULAR ADAPTER PLATE SYSTEM

(75) Inventors: Roland Türschel, Hohenbrunn (DE);
Joachim Burk, Tuerkenfeld (DE);
Marco Tin, Taufkirchen (DE); Erik Hartlieb, Donauworth (DE); Beatrice Torlot, Munich (DE); Hans-Christoph von Landwuest, Munich (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 15 days.

(21) Appl. No.: 13/346,966

(22) Filed: Jan. 10, 2012

(65) Prior Publication Data

US 2012/0193471 A1     Aug. 2, 2012

(30) Foreign Application Priority Data

Jan. 31, 2011    (EP) .................................... 11400009

(51) Int. Cl.
  *A47B 91/00*   (2006.01)
  *A47G 29/00*   (2006.01)
  *B65D 19/00*   (2006.01)
  *B65D 19/06*   (2006.01)
  *B65D 19/38*   (2006.01)

(52) U.S. Cl.
  CPC ................ *B65D 19/06* (2013.01); *B65D 19/38* (2013.01)
  USPC .............. 248/346.01; 248/346.03; 248/346.3; 211/162

(58) Field of Classification Search
  CPC ..... B65D 19/06; B65D 19/38; B65D 19/0095
  USPC ........... 248/346.01, 346.03, 346.3; 211/1.57, 211/162, 193
  See application file for complete search history.

(56) References Cited

U.S. PATENT DOCUMENTS

| | | | |
|---|---|---|---|
| 4,417,524 A * | 11/1983 | Quinn et al. ................... | 105/101 |
| 5,497,708 A | 3/1996 | Jeruzal | |
| 5,894,803 A | 4/1999 | Kuga | |
| 5,938,047 A * | 8/1999 | Ellis et al. .................... | 211/1.57 |
| 6,561,739 B1 | 5/2003 | Garala | |
| 2003/0143052 A1 | 7/2003 | Fehrle | |
| 2005/0072897 A1 | 4/2005 | Fanucci | |
| 2007/0080258 A1 | 4/2007 | Baatz | |

FOREIGN PATENT DOCUMENTS

WO     2005077755 A1    8/2005

OTHER PUBLICATIONS

Search Report and Written Opinion; Application No. EP 11400009; dated Jun. 20, 2011.

* cited by examiner

*Primary Examiner* — Amy Sterling
(74) *Attorney, Agent, or Firm* — Brooks Kushman P.C.

(57) ABSTRACT

A modular adapter plate system (1) for the installation of mission equipment in vehicles with floor panels (30), particularly for the installation of mission equipment in aircrafts such as helicopters, each plate (2-8) of said system comprising a pair of parallel seat/cargo tracks (9, 10) interconnected by stiff beam elements (11-15) and lateral flanges (16, 40) for releasable fixation to the floor panels (30) and lateral flanges (18, 19, 41, 42) for releasable interconnection. The invention is also related to a vehicle with said modular adapter plate system (1).

20 Claims, 6 Drawing Sheets

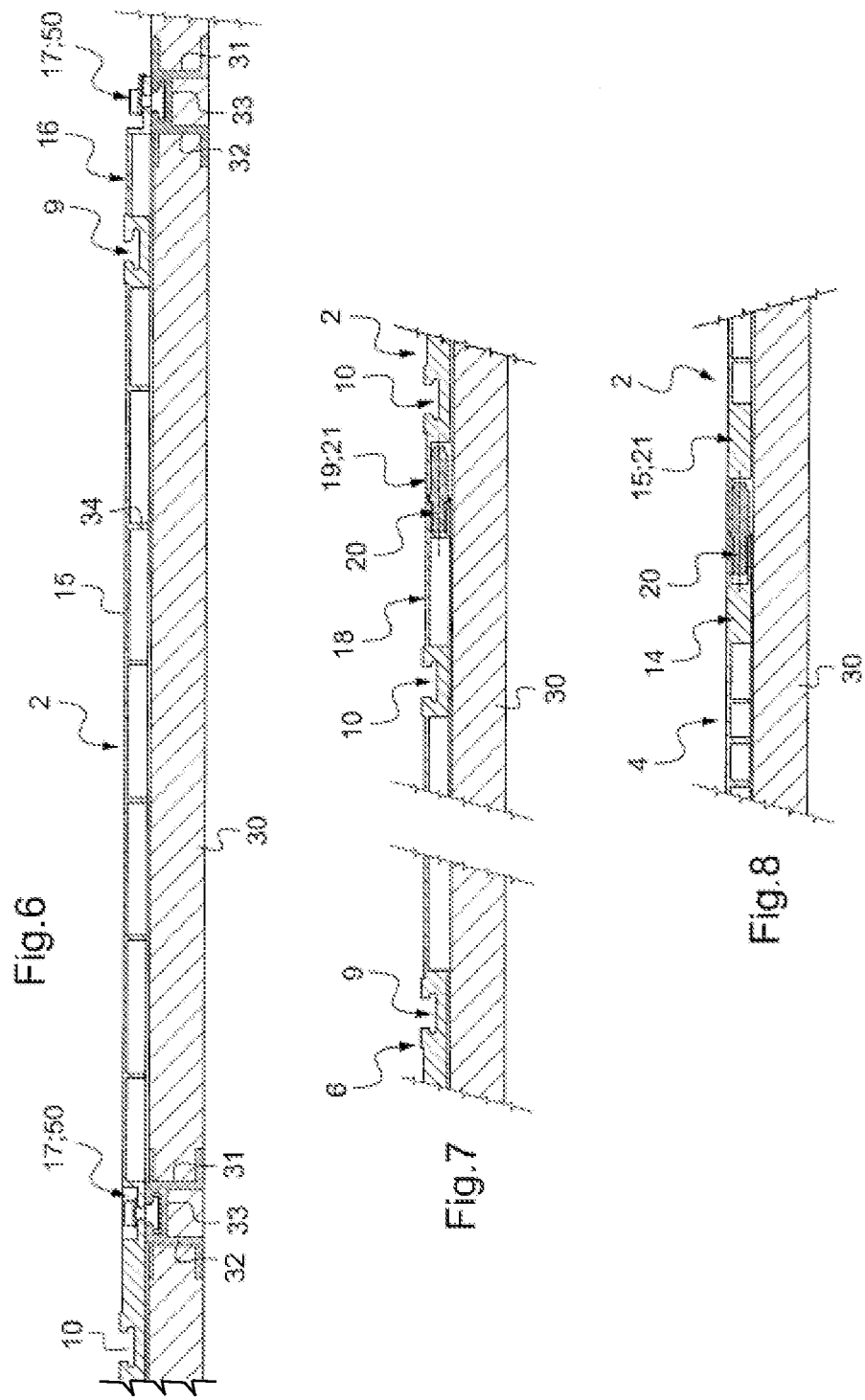

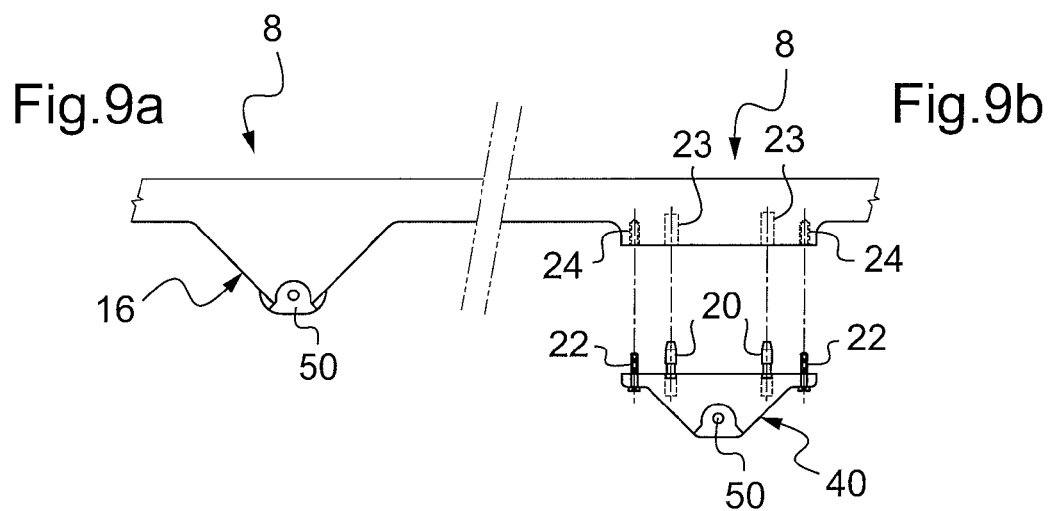
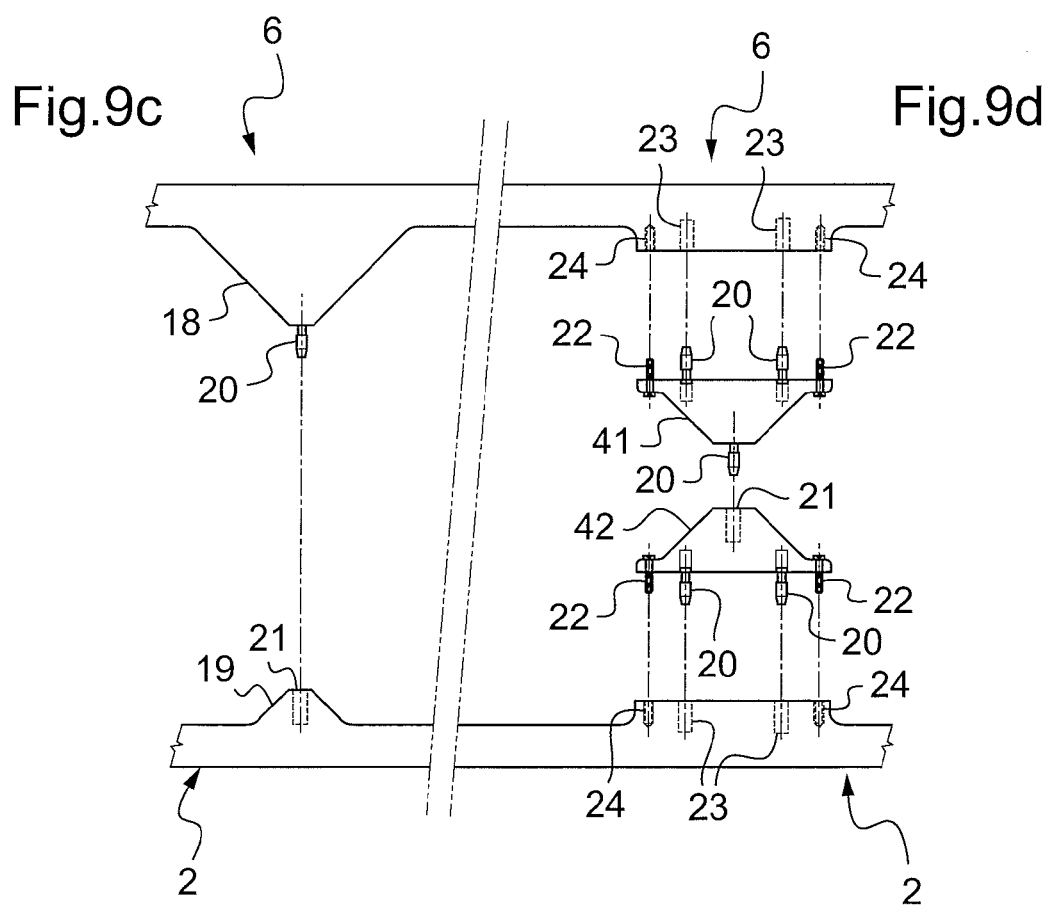

MODULAR ADAPTER PLATE SYSTEM

CROSS REFERENCE TO RELATED APPLICATIONS

This application claims priority to European application no. EP 11 400009.4 filed Jan. 31, 2011, the disclosure of which is incorporated in its entirety by reference herein.

BACKGROUND OF THE INVENTION (1) Field of the Invention

The invention is related to a modular adapter plate system according to the features of claim 1 and a vehicle with such a modular adapter plate system according to the features of claim 10.

(2) Description of Related Art

Seats in known helicopters or other mission equipment are up to now installed onto separate seat/cargo tracks being installed on a cabin floor panels by means of inserts. Said separate seat/cargo tracks have reduced stiffness properties. Depending on the mission, only a part of the installed seat/cargo tracks is required and the remaining seat/cargo tracks are removed. Removing said tracks from the cabin floor is labour-intensive, tedious and time consuming because of the high number of inserts. As the inserts have a short lifetime and the self locking mechanism of the inserts in the cabin floor panels breaks down after 3-5 uses, the inserts have to be replaced frequently, which is a time consuming and expensive operation. Some equipment arrangements are not possible and some seat/cargo tracks cannot withstand the crash loads caused by some equipment in a certain location because the necessary amount of inserts to withstand crash loads cannot be installed wherever required in the cabin floor.

The document U.S. Pat. No. 5,497,708 A discloses a multiple section pallet assembly having a primary pallet member fitted with adjustable article attachment brackets thereon to accommodate and attach a wide range of articles such as vehicle seats of varying sizes. For seat attachment, a support tray and support pedestals adjustably secured to the brackets have connector pins to fit into associated pin openings in seat structure so that the seats can be readily and securely mounted on the pallet member for conveyance and subsequently easily removed therefrom. The primary pallet member can be readily fixed to a bottom sled to form a pallet assembly. The sled has laterally spaced openings for forklift handling.

The document U.S. Pat. No. 5,894,803 A discloses a pallet comprising a substantially rectangle-shaped base plate, a frame-like rising section of a substantially rectangle-shape rising from a surface of the base plate, on which a driver's seat and assistant driver's seat or the seat for several passengers are to be carried, and surrounding said base plate, the base plate and frame-like rising section formed as one piece, by reaction injection molding.

The document U.S. Pat. No. 6,561,739 B1 discloses a connector housings attached to modules are received within aligned socket formations attached to the modules held assembled therewith forming a platform by joints established between such connector housings and the socket formations by selectively controlled locking balls projected through side walls of the connector housings into the socket formations. Such projection of the balls is guided through sleeves adjustably positioned on the housing side walls.

BRIEF SUMMARY OF THE INVENTION

It is an object of the invention to provide a reliable system for the arrangement of mission equipment with said system, being easy to install, less onerous to maintain and allowing a wide variety of equipment arrangements. It is a further object of the invention to provide a vehicle with such a system.

The solution is provided with a modular adapter plate system with the features of claim 1 of the invention and a vehicle with such a modular adapter plate system according to the features of claim 10.

According to the invention a modular adapter plate system is provided for the installation of mission equipment in vehicles with floor panels, particularly for the installation of mission equipment in aircrafts such as helicopters. Each plate of said system comprises a pair of parallel seat/cargo tracks interconnected by stiff beam elements. The seat/cargo tracks are provided with lateral flanges with releasable seat/cargo track fittings for fixation to already existing seat/cargo rails and/or anchor points of the floor panels.

Lateral flanges and releasable seat/cargo track fittings allow higher stiffness for fixation due to the higher stiffness of the inventive plates with an interconnected pair of parallel seat/cargo tracks compared to the reduced stiffness properties of the separate seat/cargo tracks of the state of the art.

The invention overcomes any difficulties caused when installing different mission equipment, e.g. in a helicopter with limited attachment points, as compared to the high number of inserts according to the state of the art, while respecting the constraints of FAR 29 (FAR=Federal Aviation Regulations), the constraints of the weight of the system and the equipment to be installed, the size of said equipment and the constraints for the means of attaching/installing said equipment.

The inventive modular adapter plate system with improved stiffness and releasable seat/cargo track fittings uses the available seat/cargo rails and/or anchor points in the floor of the vehicle with the advantage that retrofitting of said floor becomes redundant. No protection is required for the available seat/cargo rails and/or anchor points used for the inventive system, contrary to the floor inserts of the state of the art that have to be plugged against dirt.

The inventive modular adapter plate system does not require any increased maintenance effort and may be easily mounted/dismounted with the available seat/cargo rails and/or anchor points in the floor of the vehicle as many times as wanted.

The inventive modular adapter plate system allows jam free and crash resistant installation of mission equipment like seats, an O2 rack, litter, radar, operator consoles and/or medical equipment. The seat/cargo track fittings can be releasable or removable or can be an integral part of the flanges and/or transversal stiff beam elements.

According to a preferred embodiment of the invention the seat/cargo tracks and/or at least one of the two transversal stiff beam elements at the ends of the plates are provided with interconnection means for a modular axial extension of the plates of the inventive system.

According to a further preferred embodiment of the invention lateral flanges are provided with interconnection means for a modular lateral extension of the plates of the inventive system.

According to a further preferred embodiment of the invention some of the stiff beam elements are cross-linked for even further improved stiffness.

According to a further preferred embodiment of the invention the stiff beam elements are provided with attachment points for fixation to the floor panels for improved stability and for more flexible combinations of the plates of the inventive system.

According to a further preferred embodiment of the invention the lateral flanges are either an integral part of the plates or are removable for more flexible combinations of the plates.

According to a preferred embodiment of the invention the modular adapter plate system is applied to vehicles with floor panels, preferably to vehicles with reinforced floor panels, particularly for the installation of mission equipment in aircrafts such as helicopters, particularly for the installation of mission equipment like seats, O2 rack, litter, radar, operator consoles and/or medical equipment.

BRIEF DESCRIPTION OF THE SEVERAL VIEWS OF THE DRAWINGS

Preferred embodiments of the invention are described in the following description with reference to the attached drawings.

FIG. 6 shows a cross sectional view along A-A of the modular adapter plate system of FIG. 2 and the floor panels, FIG. 7 shows a cross sectional view along B-B of the modular adapter plate system of FIG. 2 and the floor panels, FIG. 8 shows a cross sectional view along C-C of the modular adapter plate system of FIG. 2 and the floor panels, FIG. 9a shows a detail D of the modular adapter plate system of FIG. 2, FIG. 9b shows an alternative detail D of the modular adapter plate system of FIG. 2, FIG. 9c shows a detail E of the modular adapter plate system of FIG. 2, and FIG. 9d shows an alternative detail E of the modular adapter plate system of FIG. 2.

DETAILED DESCRIPTION OF THE INVENTION

Figure 1:
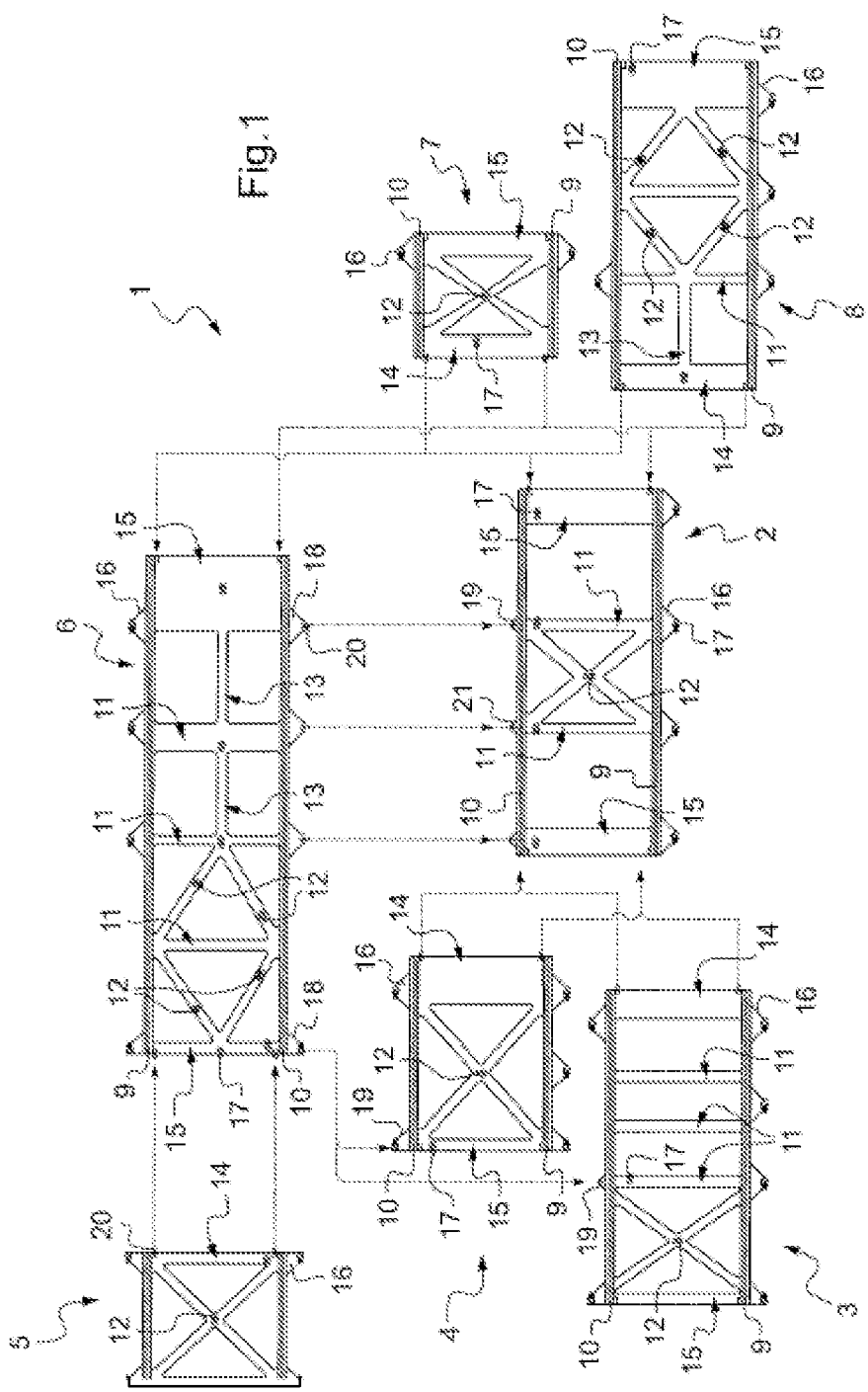
FIG. 1 shows a top view of plates for possible combinations of a modular adapter plate system according to the invention.

According to FIG. 1 a first combination of a modular adapter plate system 1 for a helicopter (not shown) comprises different plates 2, 3, 4, 5, 6, 7, and 8 that can be combined in multiple ways. Each of the plates 2, 3, 4, 5, 6, 7 and 8 has two essentially parallel seat/cargo tracks 9, 10 with a predefined distance between each other.

The seat/cargo tracks 9, 10 of plate 2 are interconnected to each other by interconnecting stiff cross beam elements 12 and transversal stiff beam elements 11. The seat/cargo tracks 9, 10 are provided at each end with interconnecting female transversal beam elements 15 for interconnection with plates 3, 4, 5, 7, and/or 8.

Lateral flanges 16 directed to the outside of the seat/cargo tracks 9, are provided with attachment points 17 for releasable seat/cargo track fittings 50 to fix plate 2 to the floor panels (see FIG. 6). The transversal stiff beam elements 11 and the interconnecting female transversal beam elements 15 are provided with attachment points 17 for said releasable seat/cargo track fittings 50 to fix plate 2 to the floor panels. Interconnecting flanges 19, directed to the outside of seat/cargo track 10 are provided for fixation of plate 2 to plate 6 (see FIG. 7).

The seat/cargo tracks 9, 10 of each of the different plates 3, 4, 5, 7, and 8 are provided at one end with interconnecting male elements in transversal beam elements 14 for interconnection with any of the plates 2, 3, 4, 5, 6, 7 and 8 with interconnecting female elements in the interconnecting female transversal beam elements 15 (see FIG. 8).

The plates 3, 4, 5, 6, 7 and 8 are provided with lateral flanges 16, directed to the outside of the respective seat/cargo tracks 9, 10 for fixation of said plates 3, 4, 5, 6, 7 and 8 to the floor panels. Some of the transversal stiff beam elements 11, 14 and the interconnecting female transversal beam elements 15 are provided respectively with an attachment point 17 for fixation of plates 3, 4, 5, 6, 7 and 8 to the floor panel.

Interconnecting flanges 19 with receptacles 21 as female elements, directed to the outside of seat/cargo tracks 10 of each of the plates 2, 3 and 4 are provided for fixation of plates 2, 3 and 4 to panel 6 (see FIG. 7).

The seat/cargo tracks 9, 10 of plate 5 are interconnected to each other by interconnecting stiff cross beam elements 12. The seat/cargo tracks 9, 10 are provided at one end with interconnecting female transversal beam element 15 with receptacles as female elements for interconnection with any of the other plates 3, 4, 7 and 8. The seat/cargo tracks 9, 10 of plate 5 are provided at the other end with interconnecting stiff transversal beam 14 with pins as male elements for respective interconnection with any of the other plates 2, 3, 4, 6, 7 and 8 with an interconnecting female transversal beam element 15 with receptacles as female elements (see FIG. 8).

The seat/cargo tracks 9, 10 of plate 6 are interconnected to each other by interconnecting stiff cross beam elements 12, transversal stiff beam elements 11, and axial stiff beam elements 13. The seat/cargo tracks 9, 10 of plate 6 are provided at each end with interconnecting female transversal beam elements 15 for interconnection with plates 3, 4, 5, 7 and/or 8.

Interconnecting flanges 18 with pins 20 as male elements, directed to the outside of seat/cargo track 10 are provided for fixation of plate 6 to any of plates 2, 3 and/or 4 (see FIG. 7).

The seat/cargo tracks 9, 10 of plate 7 are interconnected to each other by interconnecting stiff cross beam elements 12. The seat/cargo tracks 9, 10 are provided at one end with interconnecting female transversal beam element 15 with female elements for interconnection with any of the plates 3, 4, 5 and 8. The seat/cargo tracks 9, 10 of plate 7 are provided at the opposite end with an interconnecting transversal stiff beam element 14 for interconnection with any of the plates 2, 3, 4, 5, 6 and 8 with interconnecting female transversal beam elements 15 with female element (see FIG. 8). The interconnecting female transversal beam element 15 of plate 7 is provided with releasable seat/cargo track fittings 50 to fix plate 7 to the floor panels.

The seat/cargo tracks 9, 10 of plate 8 are interconnected to each other by interconnecting stiff cross beam elements 12, transversal stiff beam elements 11 and an axial stiff beam element 13. The seat/cargo tracks 9, 10 are provided at each end with interconnecting female transversal beam elements 15 for interconnection with plates 3, 4 and 7. Transversal stiff beam element 14 is provided with an attachment point 17 for releasable seat/cargo track fittings 50 to fix plate 8 to the floor panels.

Figure 2:
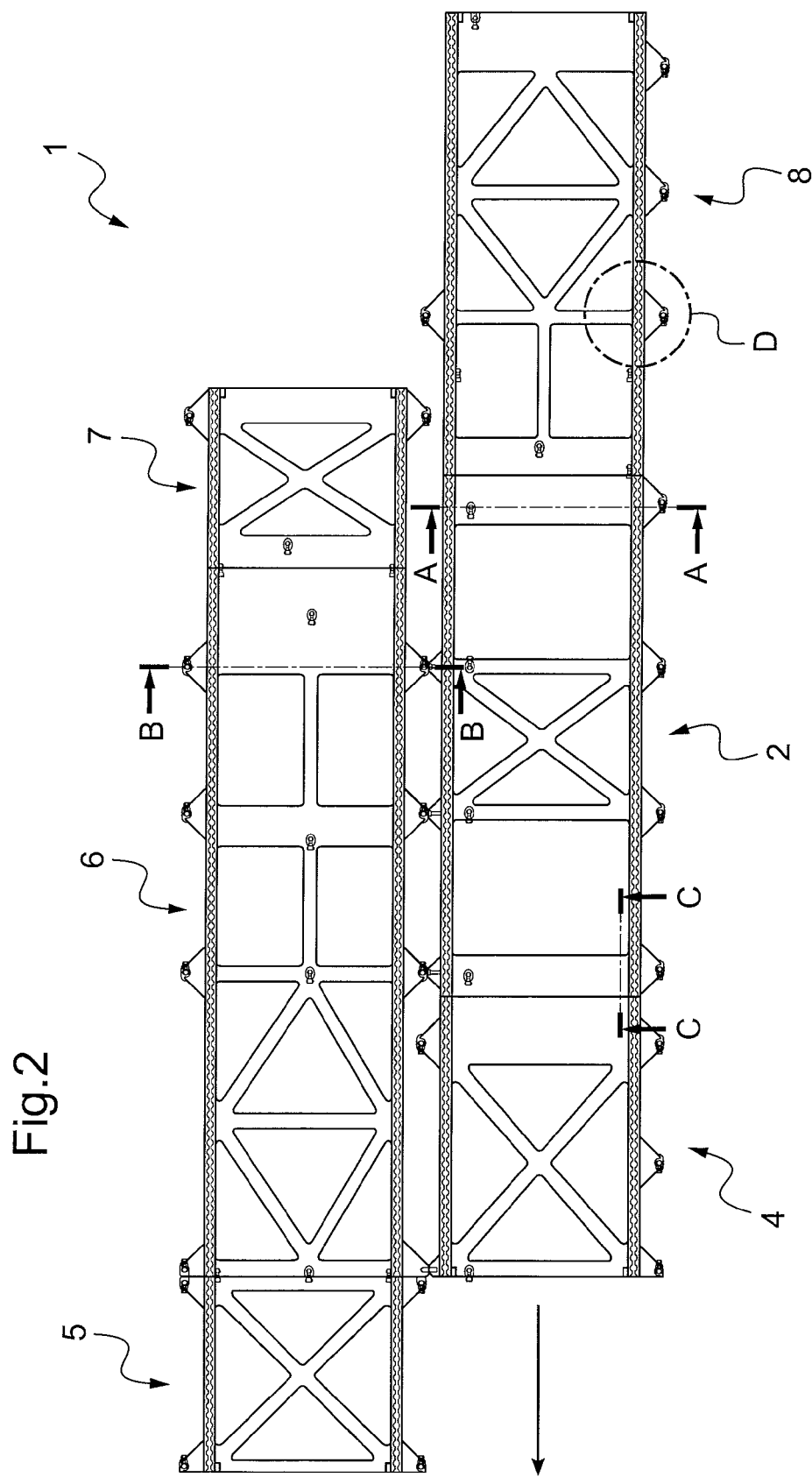
FIG. 2 shows a top view of one combination of the modular adapter plate system according to the invention.

According to FIG. 2 corresponding features are referred to with the same references as in FIG. 1. Aligned plates 4, 2 and 8 and parallel aligned plates 5, 6 and 7 are combined to a modular adapter plate system 1, with plate 4 being mounted to plate 2 by fitting the male elements of the respective transversal stiff beam element 14 of plate 4 into the female elements of the respective interconnecting female transversal beam elements 15 of plate 2. Plate 8 is correspondingly mounted to the opposed end of plate 2. The aligned plates 5, 6 and 7 are mounted by fitting the male elements of the respective transversal stiff beam element 14 of plate 5 into the interconnecting female transversal beam elements 15 of plate 6. Plate 7 is correspondingly mounted to the opposed end of plate 6.

Plates 4, 2 and 8 and plates 5, 6 and 7 are fixed by means of the lateral flanges 16 and/or attachment points 17 to the anchor points in the floor panels. Plates 2 and 3 are laterally interconnected to plate 6 by the interconnecting flanges 19 and 18.

Figure 3:
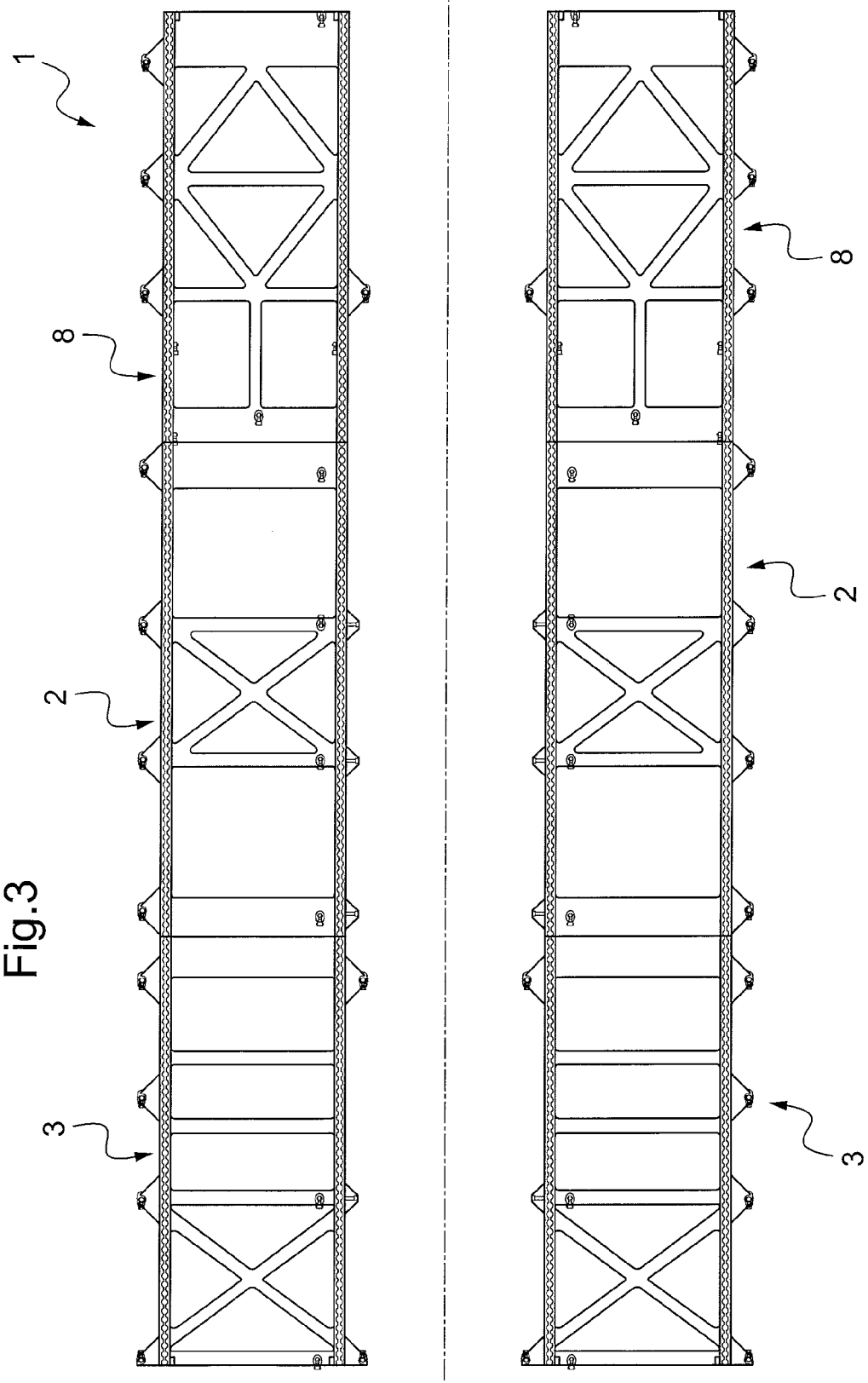
FIG. 3 shows a top view of another combination of the modular adapter plate system according to the invention, FIG. 4, 5 show an exploded view of a plate of the modular adapter plate system on seat/cargo rails and/or anchor points of the floor panels according to the invention.

According to FIG. 3 corresponding features are referred to with the same references as in FIG. 1, 2. Two sets of aligned plates 2, 3 and 8 are arranged parallel to each other into two separate modular adapter plate systems 1. The respectively aligned plates 2, 3 and 8 are essentially symmetrical to each other with respect to a longitudinal axis in the middle between the two aligned plates 2, 3 and 8.

Figure 4:
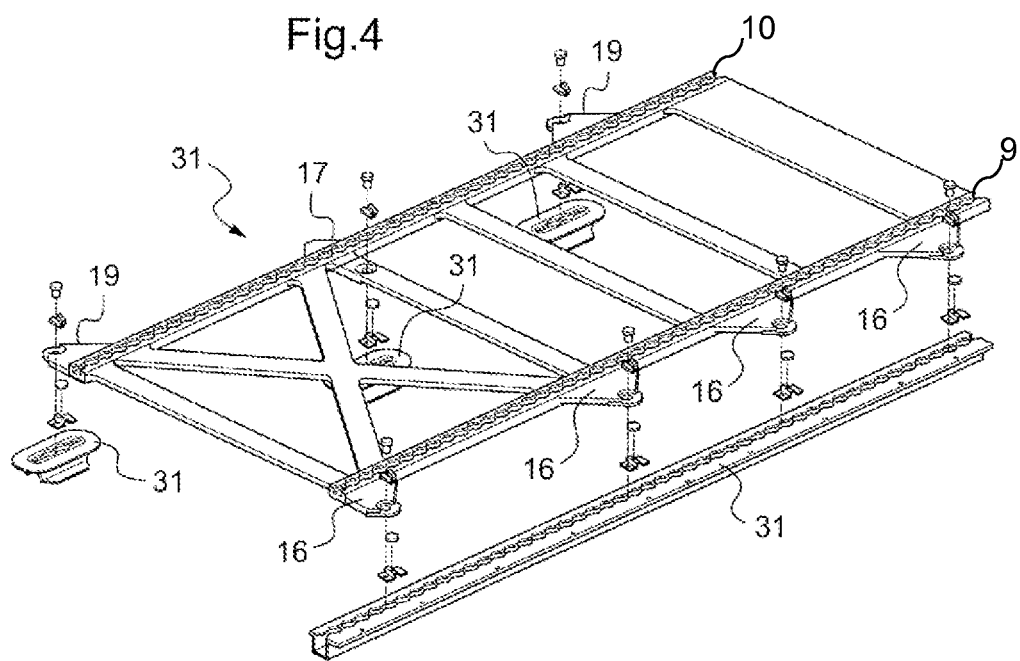

According to FIG. 4 corresponding features are referred to with the same references as in FIG. 1-3. The plate 3 is shown with its seat/cargo track 9 above a seat/cargo rail 31 and with its seat/cargo track 9 above three anchor points 31. Releasable seat/cargo track fittings 50 are provided for fixation through the lateral flanges 16 of plate 3 into the seat/cargo rails 31 and through the attachment point 17 and the lateral flanges 16 of plate 3 into the anchor points 31, to hold said plate 3 to the floor panel 30.

Figure 5:
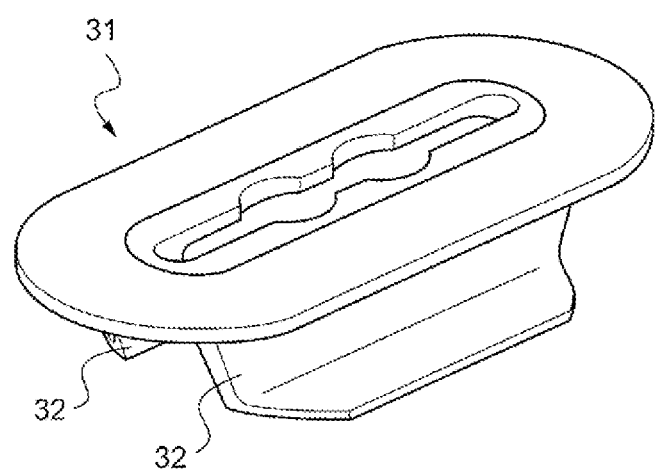

FIG. 5 shows an enlarged anchor point 31 with two essentially U-shaped stringers 32 with a dove tail recess to receive said releasable seat/cargo track fittings 50.

According to FIG. 6 corresponding features are referred to with the same references as in FIG. 1-5. Preferably the floor panels 30 inside of a helicopter cabin are relatively stiff. The floor panels 30 are provided with said seat/cargo rails and/or anchor points 31 formed respectively as a reinforced structural element of two essentially U-shaped stringers 32 linked to each other by an integral beam element 33 forming the base for the dove tail recess to rectangularly receive said releasable seat/cargo track fittings 50 complementary to said dove tail shaped recesses in the seat/cargo rails and/or the anchor points 31, said releasable seat/cargo track fittings 50 being fitted through any of the lateral flanges 16 or any of the attachment points 17 of plate 2 into the seat/cargo rails and/or anchor points 31, to hold said plate 2 to the floor panel 30. The interconnecting female transversal beam element 15 with the attachment point 17 is integral with the seat/cargo tracks 9 and 10 of plate 2 and is provided with equally distant rips 34. The lateral flange 16 is integral with the seat/cargo track 9. The lateral flanges 16 extend essentially parallel to plate 2.

Any lateral flanges 16 and attachment points 17 of plates 3, 4, 5, 6, 7 and 8 are fitted correspondingly releasable with said seat/cargo track fittings 50 into the seat/cargo rails and/or anchor points 31 provided in the floor panel 30.

According to FIG. 7 corresponding features are referred to with the same references as in FIG. 1-6. The plate 2 on the floor panel 30 is provided with the seat/cargo track 10, shaped as dove tail shaped recess and the interconnecting lateral flanges 19 with receptacles 21 as female elements to laterally mount plate 2 to the respective interconnecting lateral flanges 18 with respective pins 20 as coaxial male elements of plate 6. Plate 6 is provided with the dove tail shaped seat/cargo tracks 9 and 10. The interconnecting lateral flanges 18, 19 are integral with and extend essentially parallel to plates 2 and 6.

Any lateral flanges 19 and receptacles 21 of plates 3 and 4 are fitted correspondingly to plate 6.

According to FIG. 8 corresponding features are referred to with the same references as in FIG. 1-7. The plate 2 on the floor panel 30 is axially interconnected to the plate 4 by inserting the pins 20 as male elements in the transversal stiff beam element 14 on one side of plate 4 into the respectively opposite receptacles 21 as female elements in one of the interconnecting female transversal beam elements 15 on either side of plate 2.

According to FIG. 9a corresponding features are referred to with the same references as in FIG. 1-8. The lateral flange 16 is integral with plate 8. The releasable seat/cargo track fitting 50 is fitted through the lateral flange 16 into any of the seat/cargo rails and/or anchor points 31, to hold said plate 8 to the floor panel 30.

According to FIG. 9b corresponding features are referred to with the same references as in FIG. 1-8. A removable flange 40 is laterally mounted to plate 8 by means of pins 20 into coaxial receptacles 23 of plate 8 and bolts 22 fixed into coaxial receptacles 24 of plate 8. The seat/cargo track fitting 50 is releasable fitted through the removable flange 40 into any of the seat/cargo rails and/or anchor points 31, to hold said plate 8 to the floor panel 30.

According to FIG. 9c corresponding features are referred to with the same references as in FIG. 1-8. The interconnecting flange 18, with pin 20 as male element, is integral with plate 6. Interconnecting flange 19, with receptacle 21 as female element, is integral with plate 2. Pin 20 is coaxially introduced into receptacle 21 to laterally combine plate 2 to plate 6.

According to FIG. 9d corresponding features are referred to with the same references as in FIG. 1-8. A removable flange 41 is laterally mounted to plate 6 by means of pins 20 into coaxial receptacles 23 of plate 6 and bolts 22 fixed into coaxial receptacles 24 of plate 6. Correspondingly a removable flange 42 is laterally mounted to plate 2 by means of pins 20 into coaxial receptacles 23 of plate 2 and bolts 22 fixed into coaxial receptacles 24 of plate 2. The removable flange 41 is provided with an outwardly directed pin 20 for introduction into an outwardly directed receptacle 21 of removable flange 42. Pin 20 of removable flange 41 is coaxially introduced into receptacle 21 of removable flange 42 to laterally combine plate 2 to plate 6.

Seats (not shown) can be arranged into the seat/cargo tracks 9, 10 of the plates 2-8.

What is claimed is:

1. A modular adapter plate system for the installation of mission equipment a rotorcraft having at least one floor panel at least one of rails and anchor points, the system comprising:
  one or more modular plates, each plate of the one or more plates including a pair of parallel tracks interconnected by transversal stiff beam elements, cross-linked stiff beam elements and axial stiff beam elements for providing increased stiffness of the parallel tracks, wherein the tracks being provided with lateral flanges with releasable or integrated track fittings for fixation to the floor panels of the rotorcraft, the tracks being provided with at least one of male lateral flanges with pins and female lateral flanges with receptacles for interconnection of the plates to expand at least one of the plates in a lateral direction.

2. The system according to claim 1, wherein at least one of the stiff beam elements is provided with attachment points for fixation to the floor panel of the rotorcraft.

3. The system according to claim 1, wherein at least one of the stiff beam elements is provided with pins as male elements and at least one of the other transversal, cross-linked and axial stiff beam elements is provided with receptacles as female elements for mating with the male elements thereby interconnecting the tracks of the plates to expand at least one of the plates in an axial direction of the rotorcraft.

4. The system according to claim 1, wherein the lateral flanges are provided with attachment points for track fittings fitted into the anchor points of the floor panel of the rotorcraft.

5. The system according to claim 1, wherein the axial and transversal stiff beam element include respectively at least one axial beams and lateral beams provided with attachment points for the track fittings to be fitted into the anchor points of the floor panels of the rotorcraft.

6. The system according to claim 1, wherein the cross-linked stiff beam elements include at least two stiff beam elements that intersect and are joined at a mid-region.

7. The system according to claim 1, wherein the lateral flanges are either an integral part of the plates or in that the lateral flanges are removable with respect to the plates.

8. The system according to claim 1, wherein the lateral flanges are attached via one of the pins to receptacles in the plates and the receptacles to fasteners in the plates.

9. A modular adapter plate system for attaching equipment to a floor panel of a rotorcraft, the system comprising:
    at least one anchor rail fixed to the floor panel the rotorcraft;
    at least two modular plates adapted to be connected together and adapted to be secured along the anchor rail at a plurality of anchor positions in the rotorcraft;
    a pair of parallel tracks disposed on each of the modular plates adapted to securely mount cargo along the pair of parallel tracks at a plurality of mounting positions;
    a plurality of stiff beam elements extending between and interconnecting the pair of parallel tracks for providing increased stiffness of the parallel tracks;
    lateral flanges extend from each of the parallel tracks, the lateral flanges including at least one of male lateral flanges with pins and female lateral flanges with receptacles, wherein the lateral flanges interconnect the two modular plates in a lateral direction; and
    track fittings extending through the lateral flanges and connected to the anchor rail to hold the modular plates to the floor panel at one of the plurality of anchor positions,
    wherein cargo is adapted to be mounted to the parallel tracks at one of the plurality of mounting positions independent of the anchor position of the modular plates to the floor panel of the rotorcraft, thereby allowing cargo to be installed in the rotorcraft in a wide variety of cargo arrangements.

10. The system according to claim 9, wherein at least one of the stiff beam elements is provided with an attachment point for fixation to the floor panel of the rotorcraft.

11. The system according to claim 9, wherein at least one of the stiff beam elements is provided with pins as male elements and at least one of the other stiff beam elements is provided with receptacles as female elements for mating with the male elements thereby interconnecting the tracks of the plates to expand at least one of the plates in an axial direction.

12. The system according to claim 9, wherein the lateral flanges are provided with attachment points, wherein the track fittings are fixed through the attachment into the anchor rails of the floor panel of the rotorcraft.

13. The system according to claim 9, wherein the plurality of stiff beam elements include axial beams, lateral beams and cross-linked stiff beam elements extending between the parallel tracks to provide increased stiffness.

14. The system according to claim 13, wherein the cross-linked stiff beam elements include at least two stiff beam elements such that one of the stiff beam elements intersects another of the stiff beam elements.

15. The system according to claim 9, wherein the lateral flanges are attached via one of the pins to receptacles in the plates and the receptacles to fasteners in the plates.

16. A modular adapter plate system for attaching equipment to a floor panel of rotorcraft, the system comprising:
    at least one anchor rail fixed to the floor panel of the rotorcraft;
    at least two modular plates adapted to be connected together and adapted to be secured along the anchor rail at a plurality of anchor positions in the rotorcraft;
    a pair of parallel tracks disposed on each of the modular plates adapted to securely mount cargo along the pair of parallel tracks at a plurality of mounting positions;
    a plurality of stiff beam elements extending between and interconnecting the pair of parallel tracks for providing increased stiffness of the parallel tracks;
    connection elements formed on each of the plates to extend the plates in one of a lateral direction and a axial direction, the connection elements including at least one of a pin and a receptacle; and
    track fittings releasably connected to the anchor rail to hold the modular plates to the floor panel at one of the plurality of anchor positions,
    wherein cargo is adapted to be mounted to the parallel tracks at one of the plurality of mounting positions independent of the anchor position of the modular plates to the floor panel of the rotorcraft, thereby allowing cargo to be installed in the rotorcraft in a wide variety of cargo arrangements.

17. The system according to claim 16, wherein at least one of the stiff beam elements is provided with the pins as and at least one of the other stiff beam elements is provided with the receptacle wherein the pin mates with receptacle thereby interconnecting the tracks of the plates to expand at least one of the plates in the axial direction.

18. The system according to claim 16, further comprising lateral flanges extend from each of the parallel tracks wherein the lateral flanges are provided with the connection elements, wherein the track fittings are fixed through the attachment into the anchor rails of the floor panel of the rotorcraft.

19. The system according to claim 18, wherein the lateral flanges are attached via one of the pins to receptacles in the plates and the receptacles to fasteners in the plates.

20. The system according to claim 16, wherein the plurality of stiff beam elements are cross-linked such that one of the stiff beam elements intersects another of the stiff beam elements.

* * * * *